United States Patent [19]
Herbst et al.

[11] Patent Number: 4,931,018
[45] Date of Patent: Jun. 5, 1990

[54] DEVICE FOR TRAINING WELDERS

[75] Inventors: Donald J. Herbst, Cape Girardeau; Richard D. Fay, Jackson; David L. Frericks, Jackson; Bruce A. Blair, Jackson, all of Mo.

[73] Assignee: Lenco, Inc., St. Louis, Mo.

[21] Appl. No.: 135,321

[22] Filed: Dec. 21, 1987

[51] Int. Cl.⁵ ............................................. G09B 9/00
[52] U.S. Cl. .................................. 434/234; 434/219; 273/DIG. 28; 340/706; 340/720
[58] Field of Search .......................... 434/234, 219; 273/DIG. 28; 340/706, 707, 720

[56] References Cited
U.S. PATENT DOCUMENTS

| | | | |
|---|---|---|---|
| 4,124,944 | 11/1978 | Blair | 434/234 |
| 4,132,014 | 1/1979 | Schow | 434/234 |
| 4,680,014 | 7/1987 | Paton et al. | 434/234 |
| 4,689,021 | 8/1987 | Vasiliev et al. | 434/234 |
| 4,689,614 | 8/1987 | Strachan | 340/706 |
| 4,716,273 | 12/1987 | Paton et al. | 434/234 |

*Primary Examiner*—Edward M. Coven
*Assistant Examiner*—Jessica J. Harrison
*Attorney, Agent, or Firm*—Haverstock, Garrett & Roberts

[57] ABSTRACT

A device for training, evaluating and providing practice for welders and particularly welders and welder students that use MIG, TIG and welding devices that employ movable consumable welding rods. The device includes a video monitor having a cathode ray tube, the face of which has visual displays thereon, including displays from which simulated welding parameters can be entered and displays which simulate different welding joints with a welding target to be followed by the operator while holding the selected welding tool. The present device uses a microprocessor and related electronic devices programmed to generate the displays and to control the various machine operations. The device also includes a unique way to produce the various control responses necessary to the operation including optical and electromagnetic responses.

34 Claims, 10 Drawing Sheets

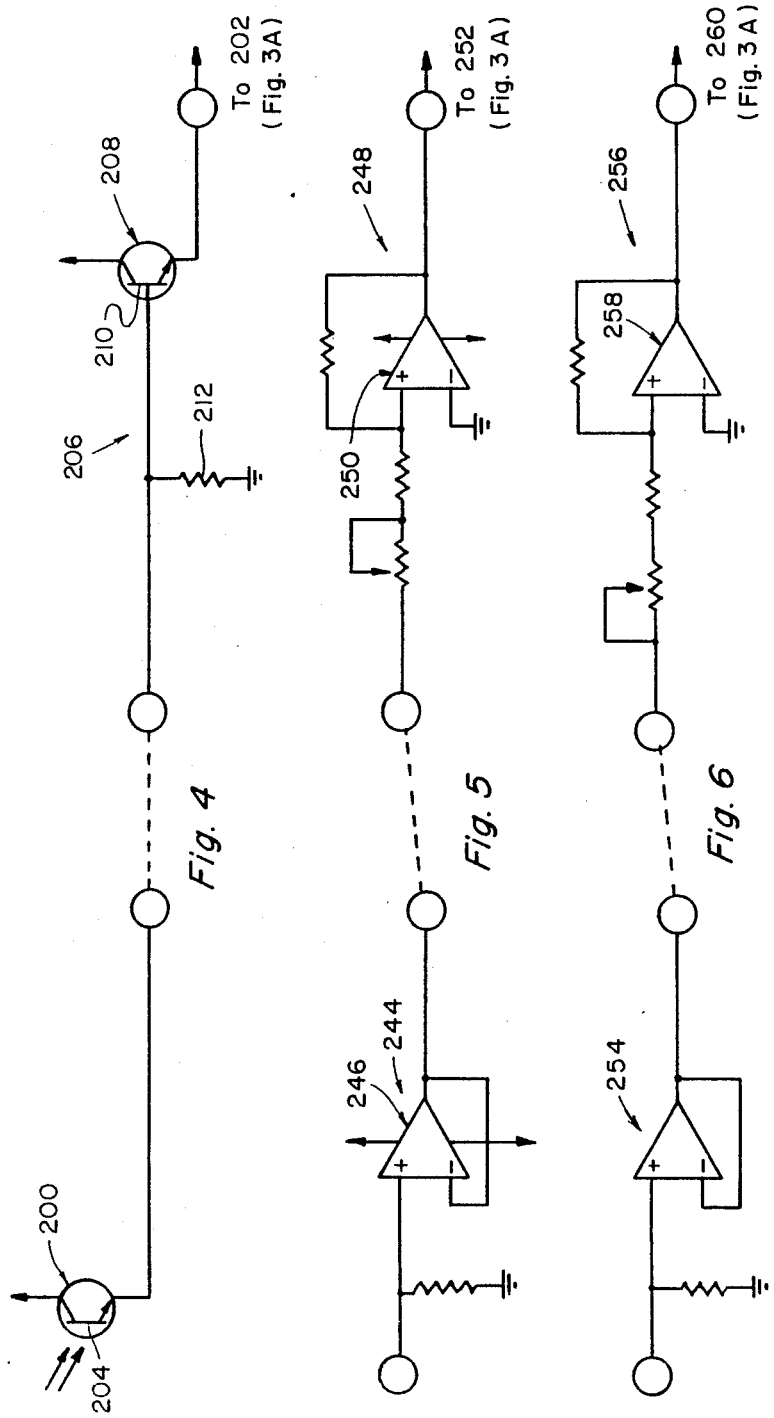

DEVICE FOR TRAINING WELDERS

PRIOR ART

There are in existence devices for training and testing welders including arc welders who use welding equipment wherein a simulated welding rod moves in its holder to simulate that it is being used up. The closest known prior art to the present construction is disclosed in Blair U.S. Pat. No. 4,124,944 which issued Nov. 14, 1978 and is assigned to Applicants' assignee. The Blair patent discloses a device for teaching persons to weld while at the same time evaluating the person's skill as a welder, and it includes means for making a visual presentation as to the person's performance. These same things are also generally true of the present construction. However, the present construction represents a marked advance over the Blair construction. More specifically, the present construction can be used to stimulate more different kinds of welding operations and devices than Blair, it can be used to train and evaluate a person's skill as a welder, and it can produce a printed record thereof.

The prior art Blair construction included a separate box-like target assembly separate from a control panel, which target assembly includes a mechanically movable target member. It was the intention that the person using the device follow the movable target member in a particular way during a simulated welding operation. The target in the Blair device could be mechanically moved at different speeds and in different patterns of movement, and the operator or welder followed the target with a hand held simulated welding tool of the stick or rod type in a particular manner and at a particular orientation in order to generate signals which could then be used to measure and assess the person's ability as a welder by measuring and recording visually the quantity and kind of errors that were made. The prior art construction included a plurality of multi-position switches mounted on a control panel which were preset to establish the parameters for the simulated welding operation to be performed including establishing the criteria as to what consititues an error, and for judging how successful the welder was in following the target with the welding tool and in holding the welding tool in proper position and orientation. The prior art device was designed for use with a welding tool that included a simulated welding rod which retracted in the tool as the operation proceeded. This meant that the operator had to continuously advance the tool toward the target to compensate for simulated rod wear as represented by rod movement in order to maintain the end of the rod and the sensor thereon in the most advantageous position relative to the moving target. The prior art construction is basically electromechanical and enjoyed some success in the marketplace.

Another prior art patent that is of some interest is recently issued Paton et al U.S. Pat. No. 4,680,014, issued July 14, 1987. To the limited extent that the Paton et al patent discloses a weld trainer that uses a cathode ray tube it is pertinent. However the construction, operation and the approach to weld training as taught by the present invention are all different from what is disclosed in Paton et al. For example the present device is PROM based, microprocessor controlled, can be used with many different kinds of welding tools, uses light sensitive images on the CRT screen to establish different selected operating parameters, and the present device uses unique sensor means on the simulated welding tool and on the CRT to produce responses, all of which are completely different from anything disclosed in the Paton et al patent. Furthermore, and importantly the present device uses an electrostatic receiver system to determine arc length and angle functions, the electrostatic system using signals applied to the CRT and receiver rings which transmit information that is thereafter used to determine arc length and angular orientation of the simulated welding gun or gun electrode. The patented construction by contrast uses screen reflectivity to determine arc length and it uses a gravity sensor to determine angular orientation. These and other differences are important and fundamentally effect the construction and operation of the present device as compared to other known devices. Other features of the present device which distinguish it from prior art devices are also readily apparent including the fact that the present device requires no initial position calibration and does not produce any profile ambiguity. Also the present system can be used to simulate regular movable stick arc welding operations as well as MIG and TIG torch operations which is not true of known devices and the present device may include means to provide a print out of errors by type, it has more operational parameters than known devices that can be selected to provide greater variation in the operation and skills required and the present device is more versatile and is able to test a greater range of skills and ability. Also the present device has on-screen warning for the hearing impaired and is software driven to allow performance improvements and the addition of new functions as they are developed, none of which is available in any known weld trainer device.

SUMMARY OF THE PRESENT INVENTION

The present construction represents a substantial advance in weld training and testing devices, and represents a new approach and generation of weld training devices and one which is more versatile than prior art devices, much less mechanical, is capable of being used to simulate more different kinds of welding equipment and welding operations, and provides a much more accurate means for evaluating and making a record of a welder's performance including, if desired, providing a printed record thereof. The present weld trainer in addition to being mechanically simpler than known constructions, is also more difficult for the trainee or operator to defeat, and it enables many more and varied operations. The device is also more compact than known devices.

The present invention resides in a novel weld training device for use by skilled as well as semi-skilled and beginner welders, and it can be used as a practice device by students and others learning to be welders and by welding instructors to evaluate the performance of welding students and others. It also provides means for teaching welding and evaluating welding performance. Furthermore, and importantly, these things can be done using the present device without using up any materials such as welding materials and the like. The present device produces various images including set up images and an image of a simulated welding target on the face or screen of a cathode ray tube such that the target on the screen can be followed by the user holding a simulated welding instrument in a manner that simulates an actual welding operation. The present device eliminates all mechanical means required in known devices for moving the target, and it eliminates the need for a plurality of switches which need to be pre-set or adjusted to establish the parameters for each simulated welding operation. In the present device the controls, for the most part, are included in the electronics of the device and in the images that appear on the face of the tube. The images on the tube serve not only as the set up means to establish the operating perameters but also establish the target and the desired movements of the target. The present device therefore has much less that can go wrong with it mechanically, it is easier to use and to set up, it can be used with more different kinds of welding devices or tools, and it can be used by persons with widely varying skills and abilities.

It is therefore a principal object of the present invention to provide improved means for teaching, training, practicing and evaluating welders and welder students.

Another object is to provide a teaching, training and practicing aid for welders which does not require using up of any consumable materials such as welding materials in order to train and provide practice for welders and welder students.

Another object is to teach the operation of a weld training device that is substantially entirely electronic and has few, if any, mechanical parts which can wear out or become inoperative.

Another object is to use images formed on the face of a cathode ray tube to establish the parameters and the target for a simulated welding operation and/or for evaluating and indicating the performance of a welder or welder student.

Another object is to provide means capable of being used to set up simulated welding conditions for beginner welders as well as for skilled welders.

Another object is to teach the operation of a relatively fail-safe weld simulating device which has no mechanical moving parts.

Another object is to teach the operation of a weld training device capable of producing a printed record as to the performance of a person operating the device.

Another object is to teach the operation of a weld training device capable of simulating different kinds of welding equipment and instruments including MIG, TIG, and welding devices that employ movable welding rods or sticks.

Another object is to enable welders and welding students practice time depending on their availability to learn the basic welding skills or to improve existing welding skills and without requiring time for set up operations, chipping welds, and plate preparation.

Another object is to provide means for reliably predicting the potential of welding students.

Another object is to provide a weld training device which is portable, requires minimum space and does not require consumables.

Another object is to provide a weld training device which is safe to use and does not produce arc burn, fumes, smoke or other hazardous conditions which are incident to actual welding operations.

Another object is to enable weld trainees to concentrate on improving specific skill deficiencies.

Another object is to enable periodic performance testing of welder students and welding employees.

Another object is to reduce the amount of electricity required to teach welding.

Another object is to make use of the interaction between a simulated welding gun tip and a metallic surface on the inside of a cathode ray tube to provide electromagnetic responses representative of welding arc length and angular orientations of the welding instrument.

Another object is to make it possible to train deaf persons to weld.

These and other objects and advantages of the present invention will become apparent to those skilled in the art after considering the following detailed specification of a preferred embodiment of the subject weld trainer in conjunction with the accompanying drawings.

DESCRIPTION OF THE DRAWINGS

FIG. 4 is a schematic circuit diagram of a phototransistor and associated circuit mounted in a simulated welding gun;

FIG. 5 is a schematic circuit diagram of the tip ring circuit also located in the simulated welding gun;

FIG. 6 is a schematic circuit diagram of the angle ring circuit located in the simulated welding gun;

DETAILED DESCRIPTION OF THE PREFERRED EMBODIMENT

Figure 1:
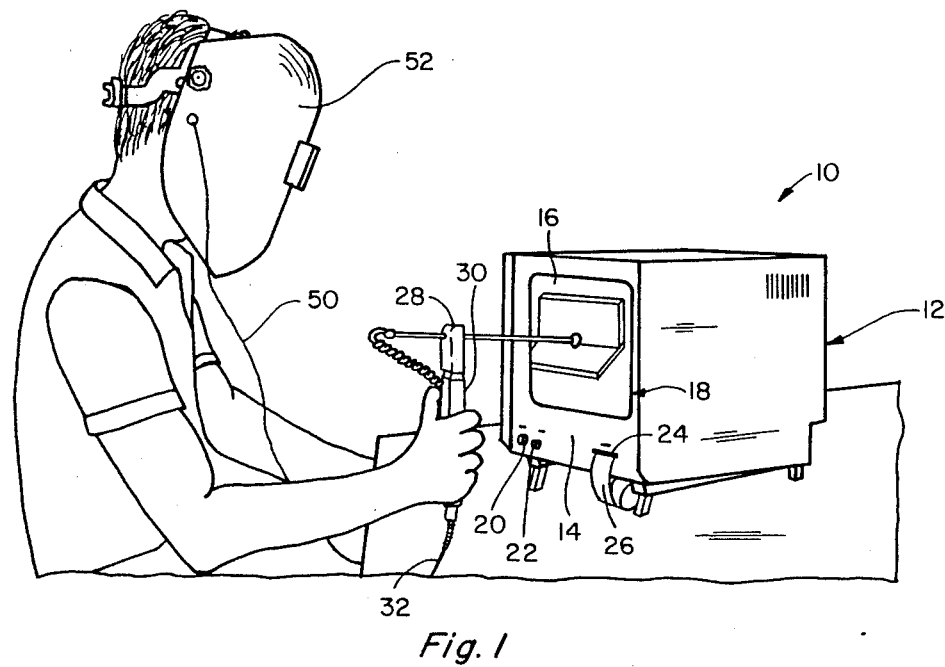
FIG. 1 is a perspective view showing a person in position operating a weld trainer constructed according to the present invention.

Referring to the drawings more particularly by reference numbers, number 10 in FIG. 1 refers to a weld trainer device constructed according to the teachings of the present invention. The weld trainer 10 includes a housing 12 with a front panel 14 that exposes the face or screen 16 of cathode ray tube 18 on which images appear that are used for various purposes as will be explained. The front panel 14 includes several controls for the weld trainer including a reset control 20, a volume control 22 and a slot 24 through which paper 26 is fed on which an optional printed record appears of the performance of a student or other person operating the subject weld trainer.

Figure 13:
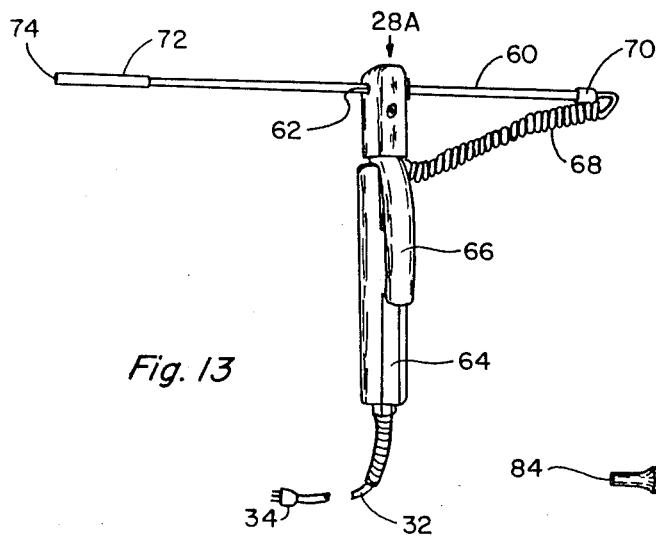
FIG. 13 is a side view of a simulated movable stick type welding gun for use with the present weld trainer.

The subject weld trainer 10 also requires some form of welding gun assembly such as the gun assembly 28 shown in FIG. 1. The gun assembly 28 may be of several different types as will be explained, and it has a handle portion 30 which is held by the operator when operating the weld trainer. The handle portion 30 is connected to the weld trainer 10 by cord 32 which has a male plug-in receptacle 34, as shown in FIG. 13, on the free end thereof. Several different types of simulated gun assemblies 28 can be used with the subject weld trainer including a movable stick type gun assembly, a TIG gun assembly and a MIG gun assembly. These will be described more in detail in connection with FIGS. 13, 14 and 15.

Figure 9:
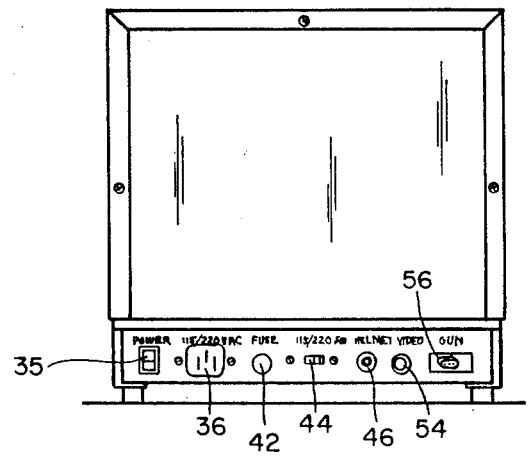
FIG. 9 is a rear view of the assembly of FIG. 8.

The housing 12 has a rear panel shown in FIG. 9 which likewise has provision for locating various controls. These include a power (on/off) switch 35, a female receptacle 36 for accommodating a male receptacle 38 on one end of a power cable 40, a fuse holder 42, a two position switch 44 which controls whether the device is to be powered from a 115 or 220 volts source, a helmet jack 46 into which a receptacle 48 on one end of a helmet cord 50 is plugged, the opposite end being attached to helmet 52 that is worn by the operator, a BNC video output jack 54 which is used when it is desired for some reason to drive a second monitor or video tape recorder (not shown) through a cable connection, and a female gun receptacle 56 for receiving the male receptacle 34 located on the opposite end of the gun cable 32.

Figure 14:
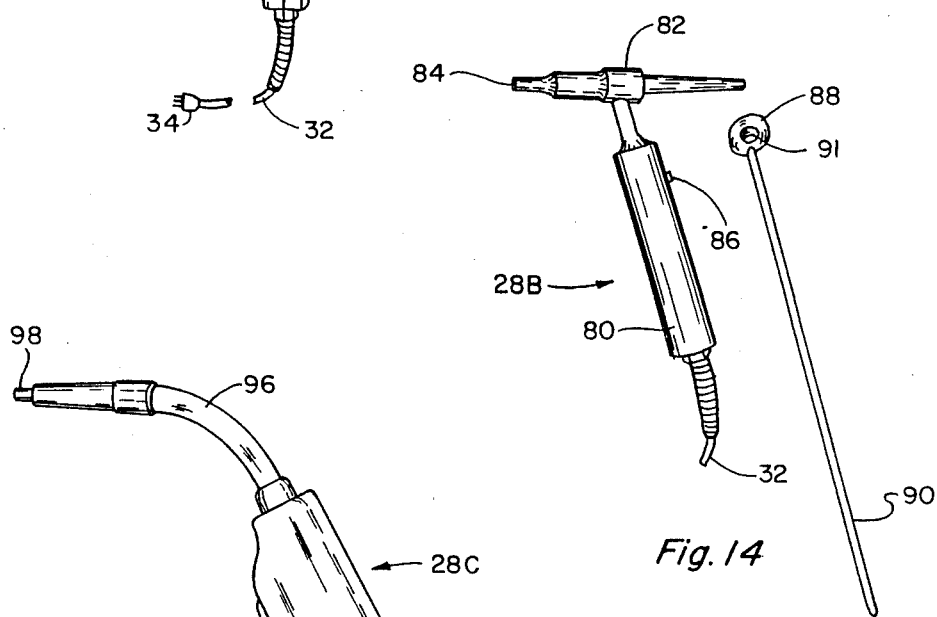
FIG. 14 is a side view of a simulated TIG gun for use with the present weld trainer.
Figure 15:
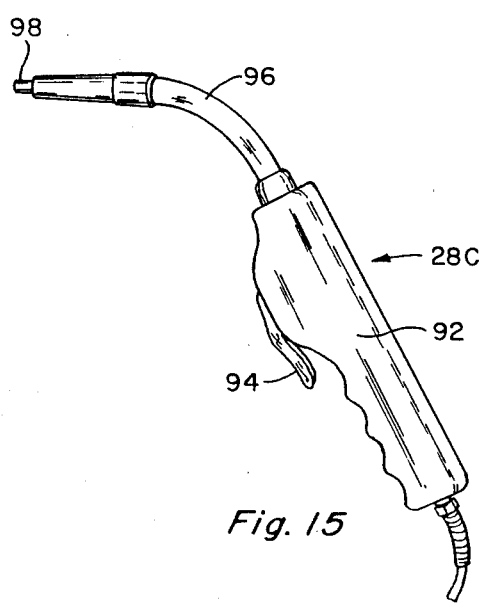
FIG. 15 is a side view of a simulated MIG gun for use with the present weld trainer.

FIG. 13, 14 and 15 show the various simulated gun assemblies 28 that can be used with the subject weld trainer. The gun assembly 28A in FIG. 13 has a movable welding stick 60 located extending transversely through an opening 62 near the free end thereof. The assembly 28A includes a handle portion 64 that has an operating lever 66 pivotally mounted to reset the rod or stick 60 to its fully extended position. The rear end of the handle portion 64 receives one end of the cable 32, the opposite end of which is attached to the male receptacle 34. The assembly 28A also has a stretchable cord 68, one end of which is connected to means on the handle portion 64 and the opposite end of which is connected to one end 70 of the stick 60. The opposite forward end 72 of the stick 60 is located on the opposite side of the handle portion 64 and includes sensor means 74 which are constructed to respond to certain images appearing on the face 16 of the cathode ray tube 18 as well as to the tube anode as will be explained. Certain images are used to control the setting up of the operating parameters for the weld trainer 10 and others are used to control the actual simulated welding operations.

The handle portions 64 of the gun assembly 28A also contains motor means (not shown in FIG. 13) which operate during a simulated welding operation to move the stick 60 in a direction to retract it on the handle or to move the forward end 72 thereof toward the handle portion 64. This is done to simulate the using up of the stick 60 as a welding operation proceeds using the gun 28A. This mean that an operator using the gun assembly 28A must continuously advance the handle toward the work (displayed on the face 16 of the tube 18) as the simulated welding operation proceeds. The gun assembly 28A, sometimes also called an electrode holder, is designed to simulate the feel experienced by a welder when handling and operating an actual electrode holder and rod. The gun assembly 28A is designed to be a close likeness of a commercial electrode holder manufactured and sold by the assignee of the present invention, and to provide the operator or student with practice in proper arc length, rod movement and rod angle. The speed at which the stick or rod 60 moves through the holder assembly 28A is adjustable to establish a desired burn rate and the rod will stop moving in the holder under some conditions if a proper arc length is not maintained.

FIG. 14 shows another type of gun assembly 28B for use with the present weld trainer which is sometimes referred to as a TIG torch or gun assembly. The assembly 28B includes a handle portion 80 attachable at one end to a cord such as the cord 32, and the opposite end of the handle is connected to a torch portion 82 which is mounted at an angle to simulate an actual TIG gun. The free end 84 of the torch 82 contains a sensor which will be described later and which is constructed to respond to certain images appearing on the face 16 of the CRT 18 and to the tube anode to establish the desired set up conditions and later to follow the target. The TIG gun assembly 28B is designed to represent an actual TIG gun and to provide the user with practice in proper arc length, tip movement and in holding the torch at proper angular orientation for welding. The assembly 28B has a switch 86 which must be held in its operative or activated condition to activate the gun. If the trigger is released, the exercise will be interrupted until the switch 86 is reactivated. The TIG gun 28B is operated in association with a guide ring or loop 88 mounted on the end of a rod member 90. The operator holds the rod 90 in one hand to locate the loop 88 while guiding the end 84 of the torch 82 in position adjacent loop opening 91 during a simulated welding operation.

FIG. 15 shows a MIG gun assembly 28C for use with the present weld trainer which is engineered and designed to simulate the feel of an actual MIG gun. The MIG gun 28C is a close likeness to a commercial MIG gun manufactured by Applicants' assignee. The MIG gun has a handle grip portion 92 with an operating lever 94 which must be held in its operative or activated condition to activate the gun. If the trigger is released the exercise will be interrupted until trigger 94 is reactivated. The MIG gun also has tubular torch end 96 with a tip portion 98 that includes a sensor element not shown in FIG. 15. The MIG gun 28C may be similar to the gun shown in Colman U.S. Pat. No. 4,403,136 assigned to Applicants' assignee.

Figure 10:
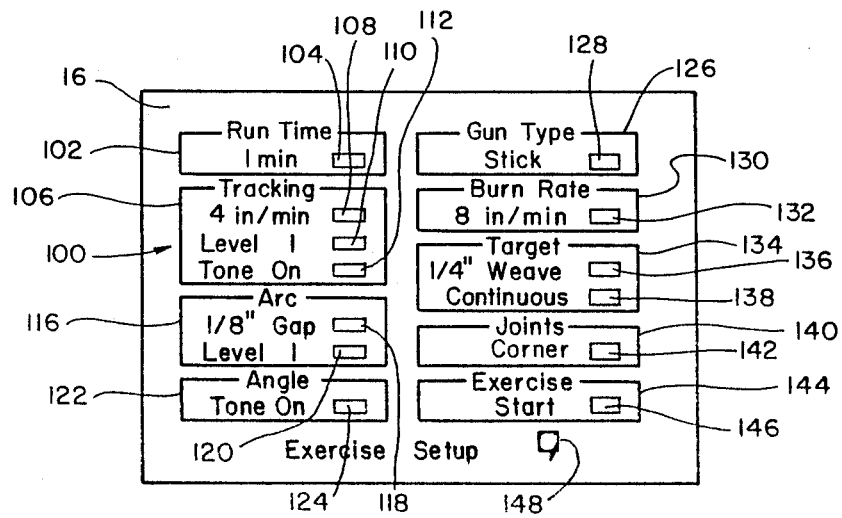

FIG. 10 shows the tube face 16 with a set-up screen image 100 appearing thereon. The set-up screen image 100 as shown has nine image blocks or areas arranged in two vertical rows, each block having a legend associated with it and one or more control spaces for the control thereof. By touching the tip end 74 or 84 or 98 of the selected gun assembly 28A, 28B or 28C respectively to the control spaces in the various blocks on the tube face 16 it is possible to establish a set of selected parameters for a simulated welding operation to be performed.

Block 102 has the legend RUNTIME and includes a control space 104 next to the statement 1 MIN. This indicates that the operating or run time for a practice welding operation using this setting will last one minute. By bringing the tip end of the welding gun 28 being used to adjacent the space 104 the weld runtime can be changed, as for example, to 3 or 5 minutes.

The next lower block 106 appearing on the screen has the legend TRACKING and includes three control or sensitive spaces 108, 110 and 112. When the tip of the selected welding gun 28 is moved against the space 108, it can change the rate at which the target/puddle 114 (FIG. 11) moves across the screen. Typical values for this parameter are 4, 8 or 14 inches per minute.

The control space 110 is used to establish the skill level required by the operator to perform a welding operation, and four possible skill levels can be set. This parameter establishes the circular boundary of the sensitive area of the target/puddle 114. A level 1 setting for this parameter provides the greatest target boundary and hense establishes the easiest to follow target, while a level 4 setting establishes the smallest possible target sensitive boundary and therefore produces the most difficult target to follow.

The space 112 is associated with the legend TONE ON and has two possible settings, one of which allows the operator to hear any tracking errors as they occur and in the other condition the audio is turned off and no errors will be heard. This control is used for various purposes including for testing and evaluation purposes.

The third block 116 has the legend ARC and has two control or sensitive spaces 118 and 120. The space 118 is shown next to the identifier ⅛″ GAP and in this condition establishes an arc distance or gap of ⅛″. The operator can set this control to other gap distances as well such as to gap distances of ⅛″, 3/16″ and ¼″.

The control space 120 has the legend LEVEL 1 and is a skill level setting. This space can be set to any one of LEVELS 1, 2, 3 or 4, and depending on which setting is selected establishes the desired electrode to target distance. The easiest level for the operator is level 1 and the hardest is level 4. As proficiency increases, this level should be correspondingly increased. Arc length errors occur whenever the operator for some reason does not maintain the desired preset arc length distance which is the distance between the tip of the gun and the screen on the target. The operator knows when he is maintaining a proper arc length by an appropriate sound in the helmet and/or by a visual display on the screen.

The fourth block 122 has the legend ANGLE and has a single control space 124 next to the words TONE ON. In the actuated condition the tone is on and the operator is constantly made aware of angle errors as they occur. A "no angle" condition occurs when the operator has the gun oriented at less than 60 degrees to the face of the screen. The "no angle" condition produces a low tone such as an easy to recognize 140 Hz tone in the helmet.

The top block 126 in the second row has the legend GUN TYPE and it has one control space 128. Placing the gun tip next to this space can change the word appearing thereon from STICK to MIG to TIG as desired depending on the kind of gun to be used.

The next block 130 has the legend BURN RATE and includes one control space 132 shown next to the expression 8 IN/MIN. This block is used only when a stick type gun such as the gun 28A shown in FIG. 13 is used, and this control is used to establish the burn off rate of the stick 60 as measured in terms of inches per minute. The burn off rate is a measure of how fast the stick 60 moves in the holder 28A, and is in turn a measure of how fast the stick motor is operating.

The block 134 has the legend TARGET, and it has two control spaces 136 and 138. The space 136 is shown associated with the expression ¼″ WEAVE and this can be changed to DRAG or to ¼″ STITCH as desired. These terms describe the various possible patterns of movement of the target that can be achieved. All of the possible patterns of target movement can be used with any of the three different types of welding guns.

The control area 138 is shown adjacent the word CONTINUOUS which, if desired, can be changed to AUTO STOP. In the continuous mode the target/puddle 114 will continue to move during a welding operation regardless of arc length, while in the AUTO STOP mode the target will only move so long as the operator holds and maintains a proper arc length.

The block 140 has the legend JOINTS and has a single control space 142, shown adjacent the word CORNER. The various possibilities for this control include CORNER, BUTT and LAP which are selected to identify the type of simulated welding joint to be produced on the screen.

Finally block 144 with the legend EXERCISE is provided with control space 146 shown next to the word START. When the tip of the gun being used is brought next to space 146, a simulated welding operation will be initiated and the selected joint with the target located at the beginning of the joint will appear on the screen. The particular joint shown will depend upon the selection made in the block 140.

The image 100 just described also contains a symbol (or closed caption) 148 with the words EXERCISE SETUP. This symbol 148 will disappear when the gun tip touches it, and the effect is to give a visual indication on the screen of the occurrence of the conditions of NO ARC, NO TRACK and NO ANGLE. This is an optional feature that is provided as an aid to the hearing impaired.

Figure 11:
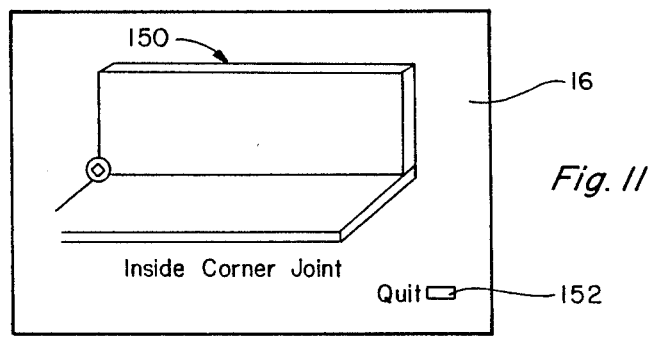
FIG. 10-12 are views of the face of the cathode ray tube showing typical control images that can appear thereon.

In FIG. 11 is shown a screen pattern to represent an inside corner joint 150 to be welded with the target 114 located at the left end of the joint in readiness to commence a simulated welding operation. This pattern also includes a control space 152 with the legend QUIT. To start a simulated welding exercise the operator touches the gun to the screen to establish proper arc length at the location of the target 114. Thereafter, as the target/puddle 114 moves across the screen and along the joint in the selected one of the three possible patterns, the operator's job is to closely follow the target/puddle movements while maintaining proper arc length and proper angular orientation of the selected gun. Errors will be evident to the operator whenever he does not hear the simulated arc sound or does hear a high pitch or a low pitch tone. The errors that occur will be accumulated during the exercise by means in the circuitry of the device and will be used to evaluate the performance of the operator. The arc sound will be interrupted whenever the operator breaks arc or does not hold the proper arc length distance between the target and the tip of the gun or rod. If the AUTO STOP and the CLOSED CAPTION conditions were selected when the set up screen was on, breaking the arc will make the target stop and the device will display a NO ARC visual indication at the top left corner of the screen.

Visual indications on the screen will also appear for a NO TRACK error condition which occurs whenever the simulated arc is not within the boundaries of the target as determined by the tracking level control. Such will occur when the CLOSED CAPTION has been activated. In like manner a NO ANGLE condition will be indicated in the upper right corner of the screen whenever the operator angles the gun or rod to an angle that is less than 60 degrees to the screen. All of the above conditions will cause errors i.e. different kinds of errors to be accumulated for later display, recording and evaluation of performance.

As the target/puddle 114 moves across the screen, it trails a simulated weld puddle behind it, and this continues until the puddle arrives at the end of the joint to be welded. When this occurs, the target returns to the beginning point on the joint and replaces the simulated path that has been welded with a straight line. A welding exercise can be terminated in two ways: either (1) by placing the tip of the gun or rod against the QUIT space 152 on the screen; or (2) by allowing the exercise to time out. In either case, another screen image replaces the joint image and it has the legend "Exercise Completed Screen", see FIG. 12.

Figure 12:
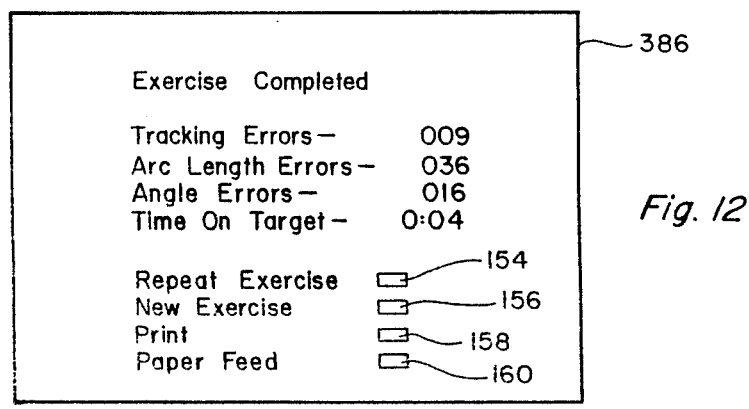

In the "exercise completed screen" 153 the operator is able to view the errors made during the now completed exercise including errors in tracking, breaking arc and angle errors. An example of how these errors are accumulated and recorded is shown in FIG. 12. This screen also indicates the amount of time the operator was correctly on target during the exercise. The more errors accumulated the less time will the operator have been on target, and conversely the fewer the errors the greater will be the total time on target.

The "Exercise Completed" screen also has control spaces 154, 156, 158 and 160 which provide the operator or student with still further options. These include a space which can be touched to repeat the same exercise, space 154; a space that can be touched for changing to a new exercise, space 156; a space to control printing out the results of the just completed exercise together with the set-up parameters for the exercise, space 158; and a space to control paper feed whenever more paper is needed, space 160.

Figure 2:
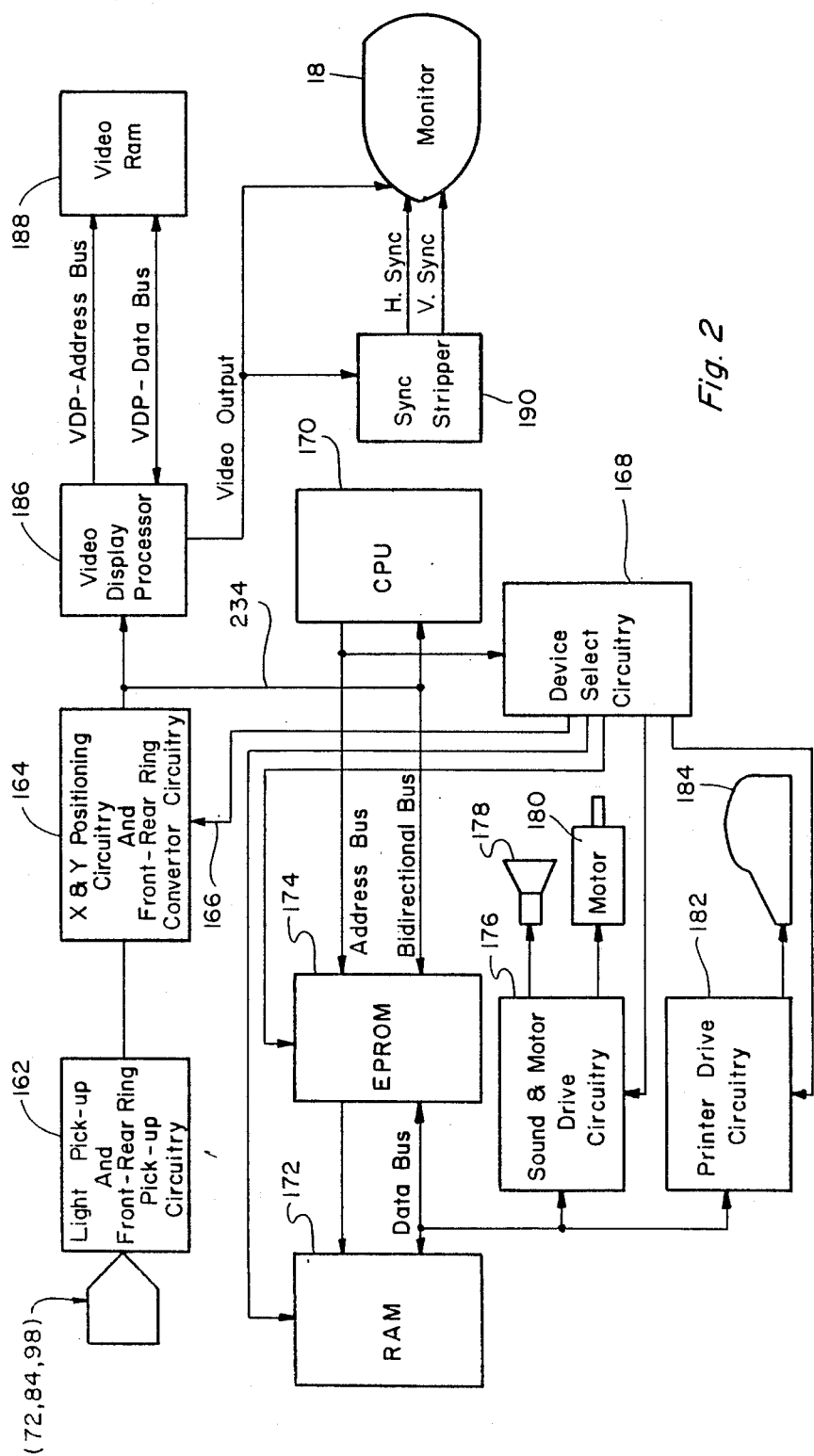
FIG. 2 is a block diagram of the circuit for the weld trainer of FIG. 1.

The block diagram in FIG. 2 shows the main circuits and circuit components for the present weld trainer 10. These include a light pick-up and front and rear ring pick-up circuit 162 shown with the gun or rod tip 72, 84, or 98 adjacent thereto. The circuit 162 has its output connected to block 164 labeled X & Y Positioning Circuitry And Front And Rear Ring Converter Circuitry. The block 164 also receives inputs at 166 from selection circuit 168. The main control for the circuit resides in the central computer unit (CPU) 170 which has numerous inputs and outputs and controls the operations of most of the other circuits including also random access memory (RAM) 172 and erasable programable memory (EPROM) 174. Other circuits connected to these include a sound and motor drive circuit 176 which controls the helmet speaker 178 and rod motor drive 180, a printer drive circuit 182 which controls printer 184, a video display processor 186 and an associated video RAM (VRAM) 188 which together control the operations of sync stripper circuit 190 and the monitor or cathode ray tube 18. The details of the construction and operation of these circuits and their various functions will be described more in detail in connection with FIGS. 3A, 3B, 4, 5, and 6.

Light Processing For X and Y Coordinates

Light processing of information appearing on the screen is necessary to establish X and Y coordinates as to where on the screen the light pen or gun tip is located to know how to process the desired control functions that result from such information.

In FIG. 4 is shown a circuit for a phototransistor 200 mounted in the tip of the selected gun or rod being used. The phototransistor 200 responds to light from a control space or from the target on the screen against which the tip of the gun or rod is positioned to generate a signal that is applied to the gun light input 202 to the circuit of FIG. 3A. When light from a selected screen control space falls on the base 204 of the phototransistor 200, it turns the transistor 200 on or to a conducting condition and causes a signal to reach control circuit 206 located in the handle portion 64 (80 or 92) of the welding gun or tool 28. The circuit 206 is included in circuit block 162 (FIG. 2) and includes a follower buffer transistor 208 with a bas 210 onto which the generated signal is applied. The circuit 206 includes an input bias resistor 212, and the output of the handle circuit 206 is applied to the input 202 of the circuit of FIG. 3A. This signal is amplified in circuits which include amplifier 214, detected by a peak detector circuit made up of diode 216, resistor 218 and capacitor 220 and inverted by inverter 222. The inverted light signal clocks a circuit 224 on the high and low transitions thereby allowing clock pulses to be applied to x and y light-bit latches 226 and 228 also located in the x and y positioning circuits 164. These circuits latch the x and y coordinates of the spot on the screen to indicate where on the screen or screen raster the light pen or rod tip is positioned. This is important to know for many reasons including knowing which of the set up controls are being adjusted as well as to know where the gun tip is located relative to the position of the target/puddle 114 during a simulated welding operation.

The x and y latches 226 and 228 are selected by selection circuits 230 and 232 in select circuit 168. A selection is made whenever the right address is applied to the microprocessor 170. A right address tells the microprocessor where on the screen the gun tip is located. The x and y coordinates thus established are applied to a data bus 234 for further use by the microprocessor 170. Associated scan circuits 236, 238, 240 and 242 are also included in the x-y positioning circuit 164 to generate horizontal and vertical scan signals for applying to the x and y positioning latches 226 and 228.

Electrostatic as distinguished from light signals are also sensed by the tip end of the gun or rod. These signals are more like radio signals than like light responses, and are used in the tip ring (arc length) and ring angle (angular orientation) of the gun circuits. The tip ring sensor 244 is located in the tip of the gun or rod and is shown in FIG. 5. The tip ring circuit includes an operational (OP) amplifier/inverter 246 connected as shown with its output fed to a circuit 248 in the tool handle where the response is amplified by another OP amplifier 250 and applied at input 252 of the circuit in FIG. 3A.

Angle ring signals from the same sensor used for tip ring signals are similarly applied to the input of a tip ring amplifier/inverter circuit 254 which in turn applies the signals to circuit 256 (FIG. 6) in the gun handle, which circuit includes OP amplifier 258. The outputs of the ring angle circuit 256 are applied at input 260 of the circuit in FIG. 3A.

The tip ring signals on input 252 and the angular ring signals on input 260 are all applied to and amplified by an amplifier circuit 262 in the circuit portion 164 shown in FIGS. 2, 3, 4 and 3A. These signals are also peak detected by circuits that include diodes 264 and 266, resistors 268 and 270 and capacitors 272 and 274 connected as shown. Thereafter the signals are converted from analog to digital form by circuits 276 and 278. The operation of the converter circuits 276 and 278 is selected by the select circuits 230 and 232 whenever a proper address is placed on the address bus 234. In the circuit as shown data is sent to the microprocessor 170 from the circuit 164 whenever read (RD) input 282 goes low. All of circuits described above respond to signals sensed by means located on the tip of the simulated welding instrument or gun, some of which are optical signals and some electromagnetic signals.

Processor Board

The circuits of the microprocessor 170 may include the associated bus controls, the memory and the timing circuits, signal registers and a arithmetic-and-logic unit in the microprocessor. As stated the CPU 170 is the control center for the subject weld trainer receiving machine language code information from the EPROM 174 for controlling and performing the various necessary machine operations. The CPU has various types of connections including among others data buses, addressing buses, read and write inputs, non-maskable interrupt inputs, maskable interrupts, RAM refresh connections, clock inputs, request inputs and input/output connections.

EPROM & RAM

The EPROM 174 provides control information for use by the CPU 170, and one of the main advantages of using an EPROM as distinguished from other storage devices is that the information contained therein can be erased and reprogrammed as desired. The RAM 172 on the other hand is provided to store data that needs to be changed during the course of a program run. These devices operate in their usual manners and off-the-shelf devices can be selected for the elements 170, 172 and 174.

Video Display Processor (VDP)

The video display processor 186 interfaces with the CPU 170, the monitor or CRT tube 18, and the video RAM (VRAM) 188 to establish information that is to be displayed on the screen 16. This includes producing a raster display with the possibility for color, if desired. The VDP 186 communicates with the CPU 170 via the data bus 234. The CPU is capable of writing and reading from the VRAM 188, writing to the VDP 186 registers and reading status registers in the VDP. In a typical application a 256×192 pixel display will be generated in 15 colors plus a transparent area. The VDP also outputs the address to the VRAM 188 over the VRAM address bus 283 and refreshes the information contained in the VRAM over data bus 284.

Sync Strip

The video information that is produced is sent to the sync stripper 190 which is a high speed comparator circuit, biased to strip the sync information from the video information. The sync is then inverted by the circuit of transistor 285 (FIG. 3B) and used to drive the video circuitry. The sync is also applied to circuit element 286 (FIG. 3A) which produces the vertical sync that is inverted by transistor circuit 288 and thereafter used to drive the video circuits.

Sound Circuits

Figure 3A:
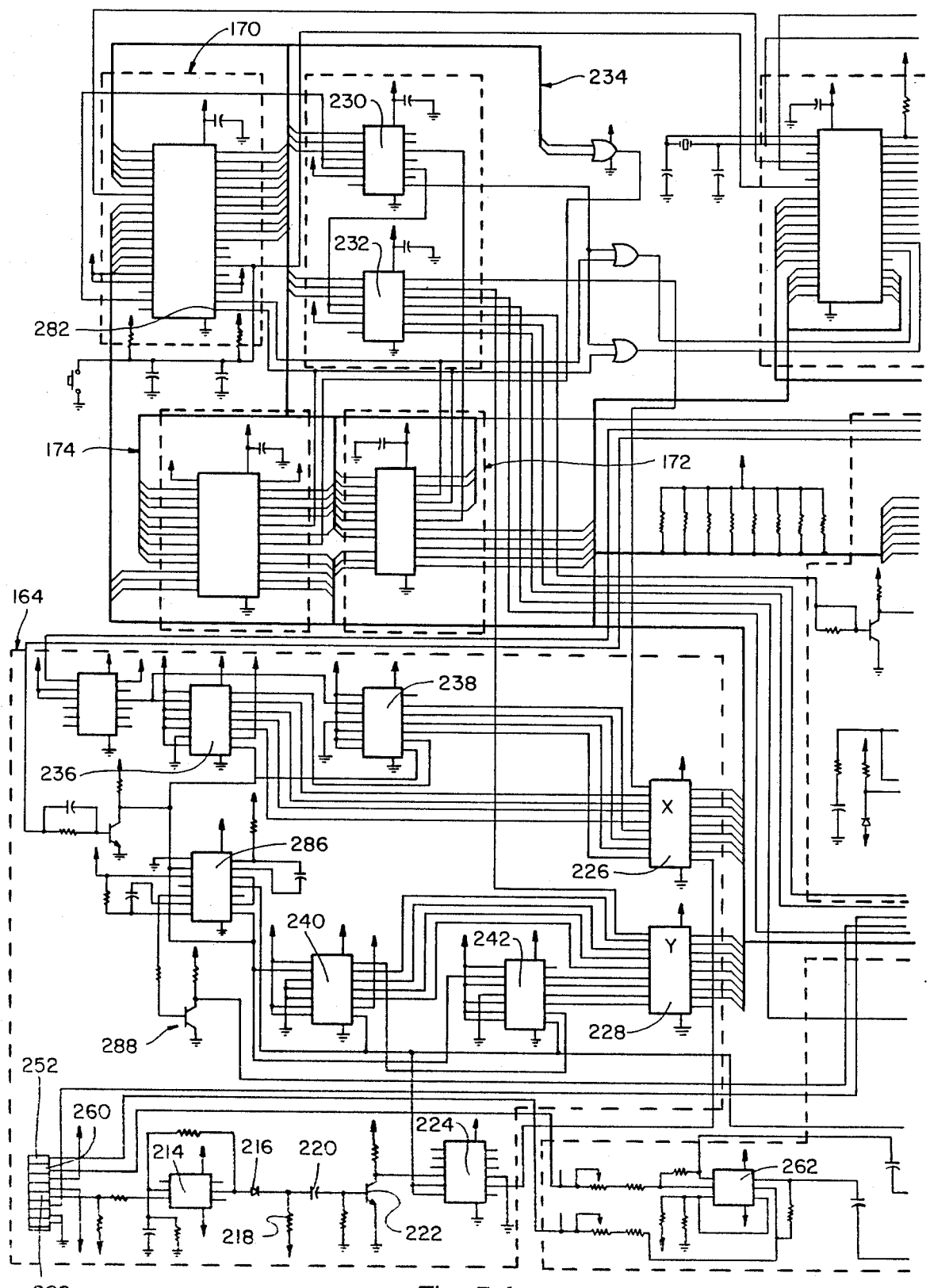
FIGS. 3A and 3B together are a detailed schematic circuit diagram of the weld trainer of FIG. 1.
Figure 3B:
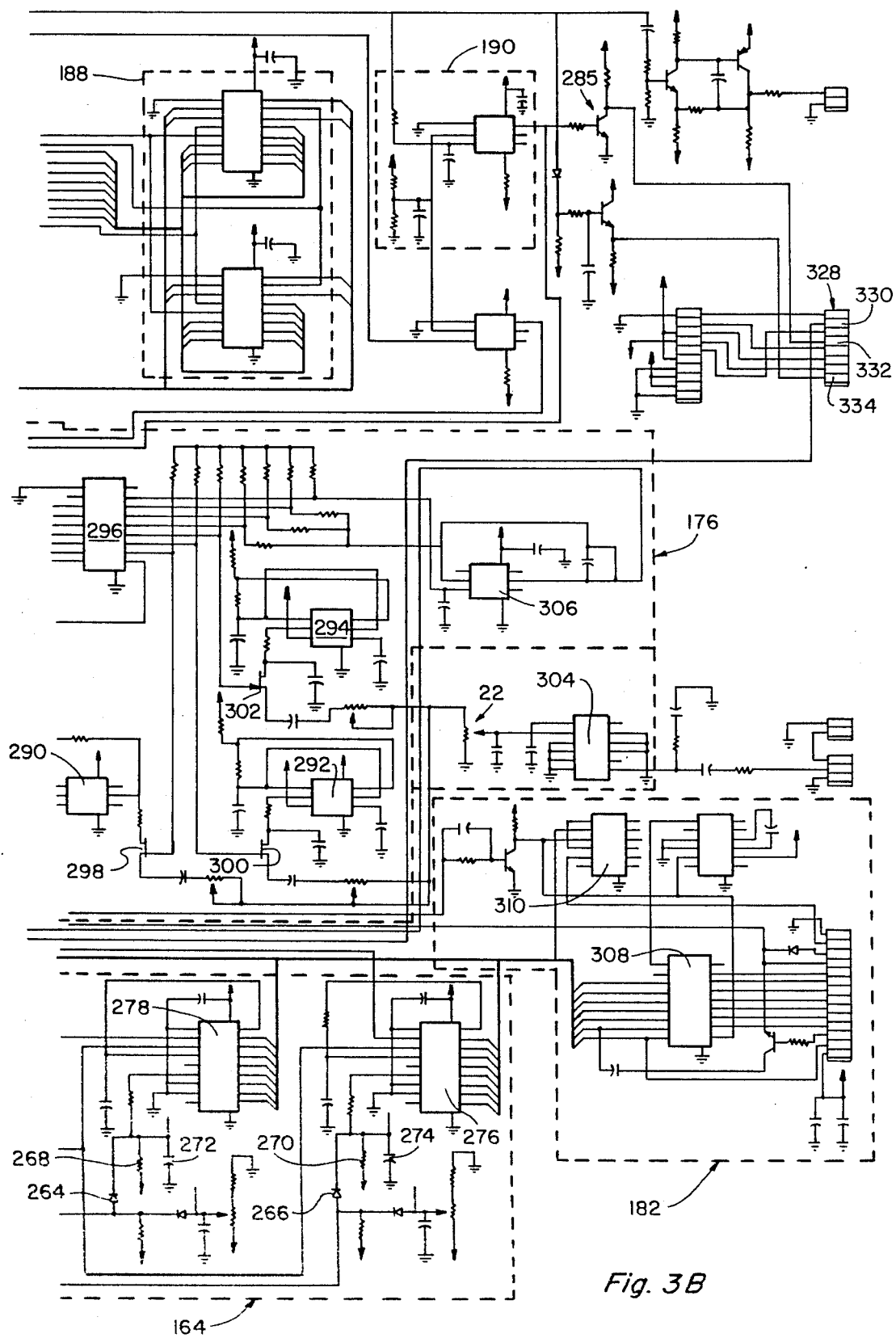

The circuits for generating sound are embodied in circuit elements 290, 292, and 294 (FIG. 3B). The elements 290 and 292 operate as a multivibrator and the element 294 operates as an amplifier. The incoming sound signals are first applied to circuit element 296 which is a latch circuit. The high and low frequency sounds are turned on when signals are applied to respective gates 298, 300 and 302 which gates allow the sound signals to pass to an audio amplifier 304. The volume control 22 located on the front panel is connected into the input to the amplifier 304 and controls the volume of the sounds that are heard in the helmet 52.

Other circuits and circuit elements are also included in the present device. These include a motor drive control 306 (FIG. 3B) for the gun handle which is in the motor drive circuit 176 (FIG. 2) to energize the motor 180 to move the movable stick 60, the printer circuit 308 which controls the operation of the printer 184 to print a record of the errors in a simulated welding operation, which device also holds the data it receives until a select pulse enables another joint circuit element 310 which uses this information to energize a thermal print head in the printer 184.

Figure 7:
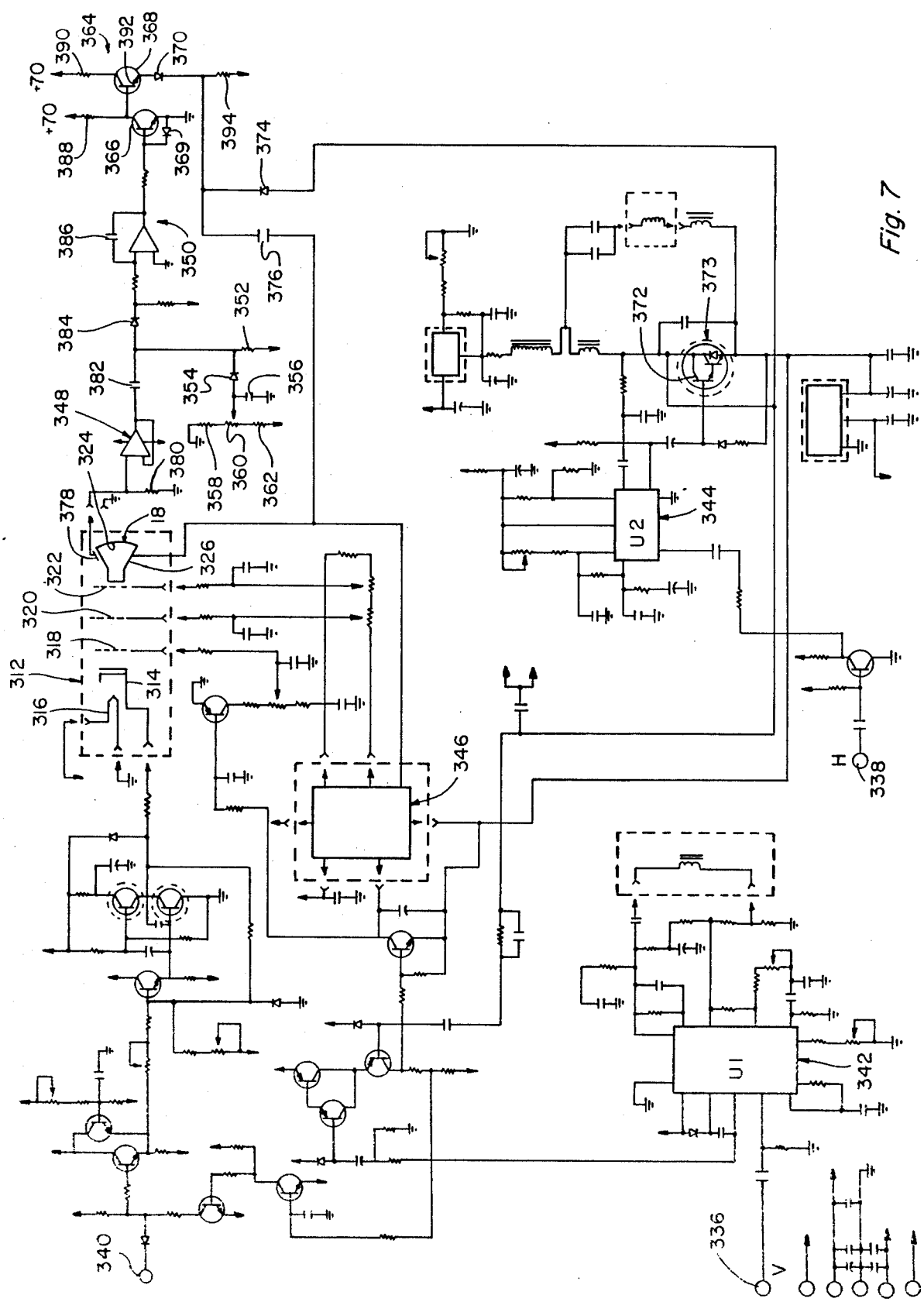
FIG. 7 is a schematic circuit diagram of the circuits associated with the cathode ray tube monitor portion of the present weld trainer.
Figure 8:
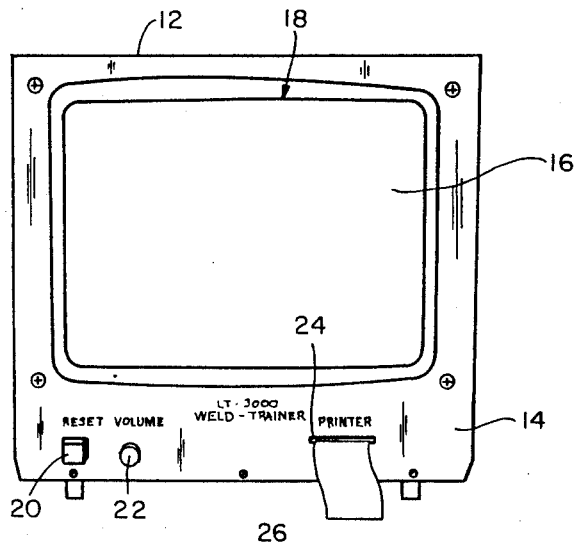
FIG. 8 is a front view of the housing assembly for the subject weld trainer device.

FIG. 7 shows the details of the video circuits for the subject weld trainer. The CRT tube 18 is shown in dotted outline 312 and includes cathode 314, heater 316, grids 318, 320 and 322 and anode 324 which is shown as a layer such as a layer of aluminum phosphorus applied on the inner surface of the front portion of tube envelope 326. The inputs to the video circuits are fed from the outputs designated generally by number 328 in FIG. 3B. These inputs include a vertical sync input 330, a horizontal sync input 332, and a video input 334. The vertical sync is applied to input terminal 336, the horizontal sync is applied at input terminal 338 and the video input is applied to terminal 340. The vertical sync is applied as input to a circuit element or chip 342 which has its output drive the vertical yoke coil, and the horizontal sync is applied to circuit element 344 which has its output used to drive the horizontal yoke coil. The vertical and horizontal sync signals applied in this manner generate the vertical and horizontal scan of the beam on the raster. The video signals applied at the terminal 340 are amplified and sent to the cathode 314 of the CRT to generate the picture. The details of the construction and operation of the video circuits described above may be relatively standard. However, it is believed novel in the video circuits to use the interaction between the tip of the gun being used and the anode 324 on the inner surface of the tube envelope 326 to produce electromagnetic responses for feeding to a voltage follower 348 which is an OP amplifier and in turn feeds another OP amplifier 350 operating in its high gain mode by way of a bias circuit which includes resistor 352, diode 354, capacitor 356 and a voltage divider circuit made up of resistors and potentiometer 358, 360 and 362. This bias circuit serves as a tip clamp circuit.

The output of the OP amplifier 350 is applied to a follower circuit 364 that includes transistors 366 and 368, feed back diode 369 and peak-to-peak controlled clipper diode 370. As indicated a metallic coating is applied to the inner surface of the face of the CRT 18, and this coating forms the anode 324 and operates in conjunction with the gun tips 74, 80 and 98 of the selected gun to produce electromagnetic response that are used to determine arc length and gun tip angle, both of which are important to the operation as aforesaid. These responses are dependant on the spacing between the gun tip and the tube face and on the orientation of the gun tip relative to the tube face. So far as known it is new to use a probe tip or the like and a coating on a tube face to generate signals in this manner. It is also believed new to use a welding gun tip and a metallic surface (anode) on a CRT tube for this purpose. The responses produced in this way are fed to the follower/clipper circuits described for use in the present weld trainer.

The horizontal scanning system for the cathode ray tube 18 produces a parabolic shaped pulse which is available on the collector 372 as a switch transistor 373 for the horizontal sweep and is routed therefrom to the anode 324. This pulse is controlled in amplitude by the circuit elements that feed diode 370 and the pulse is coupled to the tube 18 through the capacitor 376. This pulse is applied to the high voltage inside anode 324 on the cathode ray tube 18 and appears wherever the coating such as an aluminum phosphor coating is applied. The portion of the anode coating 324 used in the subject device is the part that is located behind the phosphor on the face of the tube 18. The pulse on the anode 324 is transmitted electrostatically to any metallic object located on or adjacent to the outside of the tube 18 in the vicinity thereof. The present device employs three possible metal members or pieces, two of which are located on the selected simulated welding gun and are the surfaces on which they produce the tip ring and angle ring signals. The tip ring portion of the signal is a measure of the distance from the tip of the welding gun to the adjacent face of the cathode ray tube 18. The angle ring signal is a measure of the angle at which the gun is being held relative to the tube face. This way of producing signals and the purposes for which they are produced and used are unique.

The circuit that controls the amplitude of the pulse being transmitted starts with a third piece of metal 378 that is glued to or otherwise attached to the outer surface of the cathode ray tube. Pulses are produced on the member 378 for applying across the resistor 380 which operates to set the DC level of these signals to ground. The element 348 has an output of relatively low impedance which is connected to the capacitor 382 which applies the pulse to the tip clamp circuit formed of elements 352-362. This circuit establishes the DC level at the output of OP amplifier 348. Another diode 384 rectifies the positive peaks of the pulses in the output of the element 348 and a capacitor 386 across the amplifier 350 stores the peak level as the pulses and stabilizes the amplifier 350. The amplifier 350 compares the signal level thus stored to ground and amplifies the difference therebetween.

The transistor 366 shifts the output of the amplifier 350 from a relatively restricted voltage range such as a range from 0-12 volts to a greater range such as a range from 1-70 volts. This is made possible by resistors 388 and 390 which have one of their ends connected to a plus 70 volt source. The output on the collector of the transistor 366 is connected to the base of the transistor 368, which transistor has a low impedance output on its emitter electrode 392. The emitter 392 is connected to one side of the diode 370 which is included to protect the transistor 368 from voltage reversals. The pulse at the cathode of the diode 374 is clipped by resistor 394 to the level of the voltage on the cathode of the diode 370.

If the amplitude of the transmitted pulses obtained in the manner illustrated above changes, the piece of metal 378 attached to the outer surface of the cathode ray tube 18 and the amplifier 348 sends the pulse so produced to the diode 354, which operates to set the most negative part of the signal to some reference. The diode 384 on the other hand measures the most positive part of the signal for applying to the amplifier 350 and the amplifier 350 compares this signal to ground and amplifies to difference which is a new difference signal. The transistors 366 and 368 and the diode 370 apply this new difference signal to the cathode of the diode 374 which clips the pulse at a new level and corrects its amplitude. It therefore can be seen that with the circuit as described it is possible to produce signals that are representative of the position of the tip of the gun or rod relative to the anode 324 coated on the interior surface of the cathode ray tube 18. In this way the tip ring and angle ring signals are produced for use in the weld trainer device as explained above.

Figure 16:
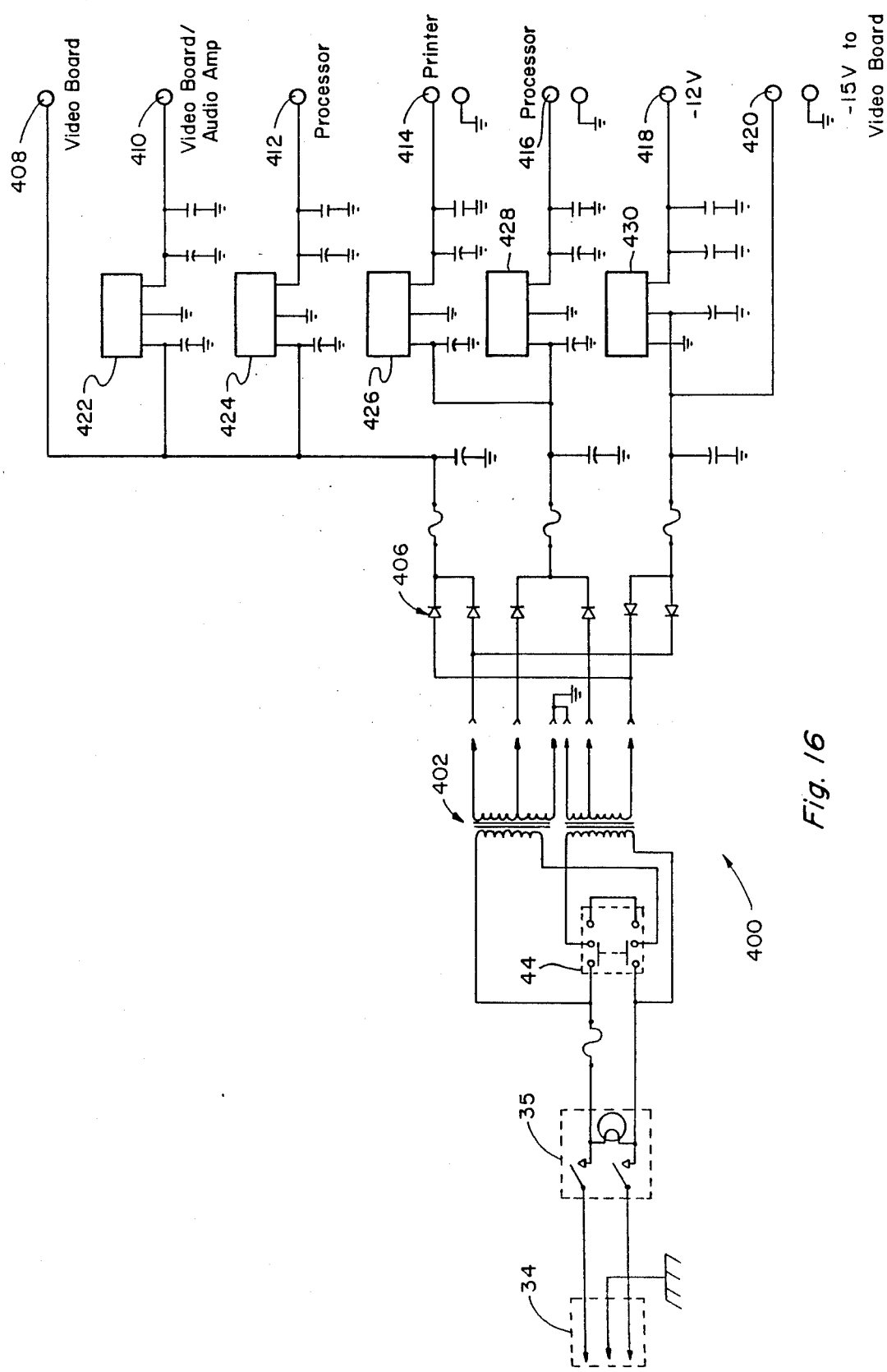
FIG. 16 is a schematic circuit diagram partly in block form of the power supply for the subject weld trainer.

A power supply circuit 400 for the subject device is shown in FIG. 16 and includes the grounded input receptacal 34, power switch 35, power selection switch 44, and transformer 402, the outputs which are rectified by rectifiers 406 which have their outputs connected to various output terminals 408-420, some by way of circuit elements 422-430. The terminals 408-420 have legends that identify where they are connected to other parts of the circuit. The power supply circuit 400 operates by having the stepdown transformer 402 feed suitable rectifier and filter circuits to provide the necessary operating potentials.

Figure 17:
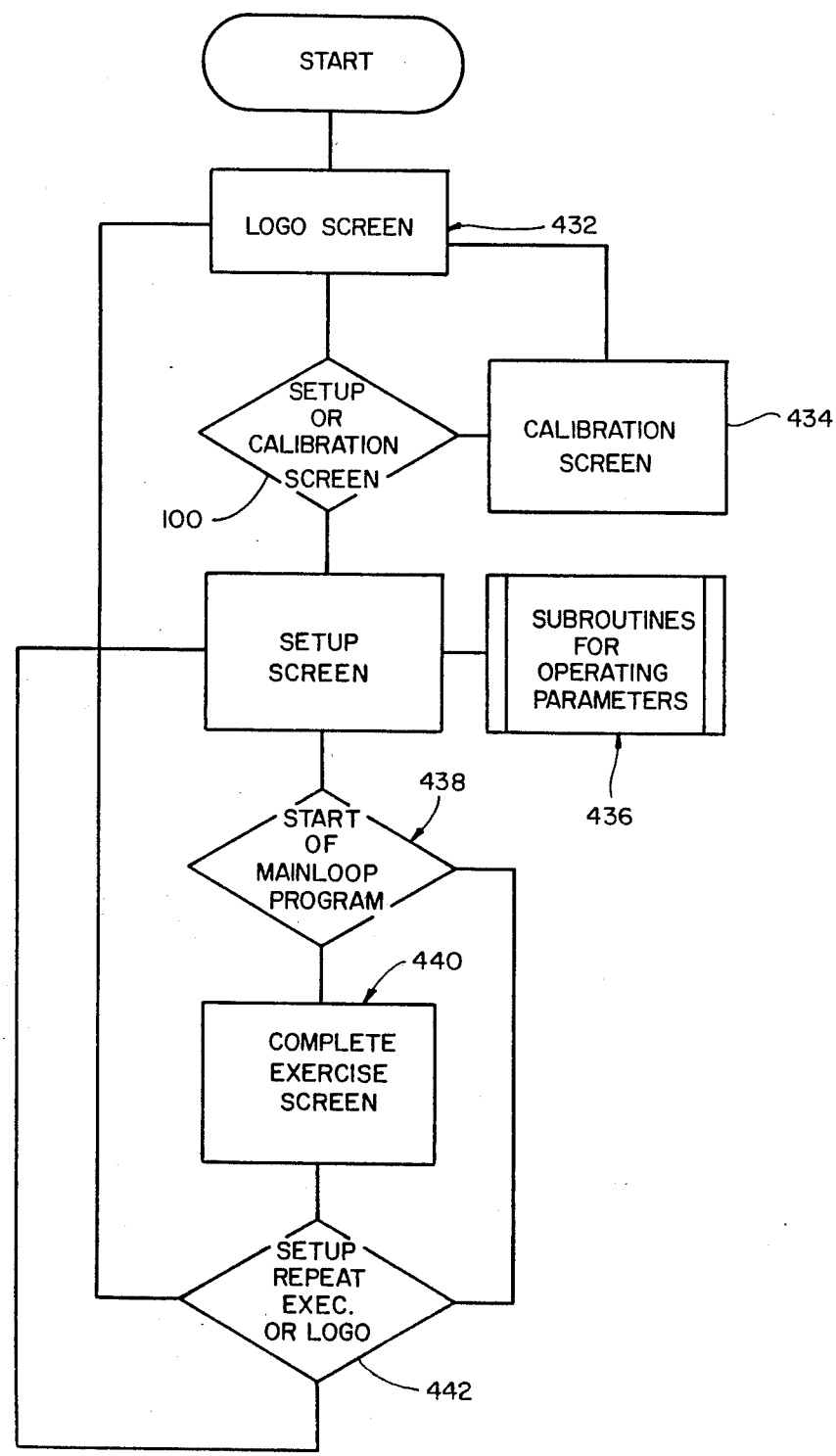
FIG. 17 is a flow chart for the subject weld trainer.

FIG. 17 is a flow chart for the subject weld trainer 10. When the device is turned on and started there will be a time lapse until a logo screen 432 appears with information to introduce the program and with a sensor space (not shown) that is activated by bringing the tip of the selected welding gun adjacent thereto. When this has been done the operator will have the choice of selecting between the set up screen 100 described above and a calibration screen 434 used by service personnel. The details of the calibration screen are not shown in the drawings.

When the set up screen 100 appears the various parameters can be established as described above all of which are included in block 436 which has the legend Subroutines For Operating Parameters. The set up screen 100 enables going into the start of the Mainloop Program 438 which is the simulated welding program. Once the program is initiated the operator has the option of prematurely aborting the welding program and repeating the set up procedure and/or going back to the logo screen 432 or tuning out the simulated welding operation after which the Complete Exercise Screen 440 will appear which is the screen that shows the number and kinds of errors and the time on target during the exercise. From the Complete Exercise Screen 440 the operator can repeat the Set Up Screen 100 or return to the Logo Screen 432 using the setup, repeat exec, or Logo screen 442.

From what has been said and described above it can be seen that the present device represents a very versatile, easy to operate, compact weld trainer device that can be used by persons of widely varying skills and experience and can also be used as an effective training and practice device.

Thus there has been shown and described a novel weld training and testing device which fulfills all of the objects and advantages sought therefor. It will be apparent to those skilled in the art, however, that many changes, modifications, variations and other uses and applications for the subject device are possible. All such changes, modifications, variations and other uses and applications which do not depart from the spirit and scope of the invention are deemed to be covered by the invention which is limited only by the claims that follow.

What is claimed is:

1. A weld simulator comprising a monitor having a screen on which video images can be produced, means for generating a set up display on the monitor including set up legends representing different parameters to be simulated and associated sensitive areas, and a simulated welding display representing a simulated welding joint with a welding target to be moved and followed therealong, a simulated welding tool having a handle portion and a welding tip portion for movement by an operator to positions adjacent to the displays, the tip portion including first and second distinct sensor means for reacting to selected sensitive areas on the set up display and to the target on the simulated welding display when the tip portion of the tool is moved adjacent thereto to produce changes in the displays and corresponding changes in the simulator functions.

2. The weld simulator of claim 1 wherein the set up display includes a plurality of legends on the screen to identify respective parameters to be established, the sensitive areas associated with the respective legends responding to the tip portion of the simulated welding tool being moved adjacent thereto to change the condition of the respective parameters, each legend representing a different parameter to be simulated.

3. The weld simulator of claim 1 wherein the target on the simulated welding display produces interaction between the screen and tip when the tip portion of the simulated welding tool is positioned adjacent thereto including interactions representative of the distance between the tip portion and the monitor screen and interactions representative of the angular orientation of the tip portion relative to the target in the display.

4. The weld simulator of claim 1 wherein the simulated welding tool is a simulated MIG welding gun.

5. The weld simulator of claim 1 wherein the simulated welding tool is a simulated TIG welding gun.

6. The weld simulator of claim 1 wherein the simulated welding tool is a simulated stick type welding gun.

7. The weld simulator of claim 1 wherein the sensitive areas adjacent to the set up legends on the set up display include areas of predetermined optical characteristics, one of the distinct sensor means on the tip portion of the simulated welding tool reacting to the characteristics of the sensitive areas for producing changes in the legend and the parameter associated therewith.

8. The weld simulator of claim 7 wherein the set up display includes a legend as to simulated arc length with an associated sensitive area, the one of the distinct sensor means on the tip portion of the simulated welding tool reacting with the sensitive area when positioned adjacent thereto, and circuit mean operatively connected to the one sensor means to establish a predetermined simulated arc length.

9. The weld simulator of claim 7 wherein the set up display includes a legend as to operation run time with an associated sensitive area, the one of the distinct sensor means on the tip portion of the simulated welding tool reacting with the sensitive area when positioned adjacent thereto, and circuit means operatively connected to the one sensor means to establish a desired operational run time.

10. The weld simulator of claim 7 wherein the set up display includes a legend as to welding rate with an associated sensitive area, the one of the distinct sensor means on the tip portion of the simulated welding tool reacting with the sensitive area when positioning adjacent thereto, and circuit means operatively connected to the one sensor means to establish a predetermined simulated welding rate.

11. The weld simulator of claim 7 wherein the set up display includes a legend as to the type of weld joint to be simulated with an associate sensitive area, the one distinct sensor means on the tip portion of the simulated welding tool reacting with the sensitive area when positioned adjacent thereto, and circuit means operatively connected to the one sensor means to establish a particular simulated weld joint on the monitor screen.

12. The weld simulator of claim 7 wherein the set up display includes a legend as to welding rate with an associated sensitive area, the one distinct sensor means on the tip portion of the simulated welding tool reacting with the sensitive area when positioned adjacent thereto, and circuit means operatively connected to the one sensor means to establish a desired simulated welding rate.

13. The weld simulator of claim 7 wherein the set up display includes a legend as to simulated rod burn rate and an associated sensitive area, the one distinct sensor means on the tip portion of the simulated welding tool reacting with the sensitive area when positioned adjacent thereto, and circuit means operatively connected to the one sensor means to establish a desired simulated rod burn rate.

14. The weld simulator of claim 7 wherein the set up display includes a legend as to the desired pattern of movement of the simulated target along the simulated weld joint and an associated sensitive area, the one distinct sensor means on the tip portion of the simulated welding tool reacting with the sensitive area when positioned adjacent thereto, and circuit means operatively connected to the one sensor means to establish a desired pattern of simulated target movement.

15. The weld simulator of claim 7 wherein the set up display includes a legend as to the generation of sound to simulate a welding condition and an associated sensitive area, the one distinct sensor means on the tip portion of the simulated welding tool reacting with the sensitive area when positioned adjacent thereto, and circuit means operatively connected to the one sensor means to establish whether the simulated welding sound will be audibly produced.

16. A device for simulating an arc welding operation comprising a video monitor having a screen on which images can be displayed including images for use in establishing operating parameters for a simulated welding operation and images including a simulated joint to be welded and an associated target image located adjacent to and movable along the simulated joint, a simulated welding tool having a handle portion and a tip portion with first sensor means thereon for positioning adjacent to the images on the screen to respond to selected parameter images appearing on the screen to produce changes in the corresponding operating parameters and second sensor means to respond to the target image appearing on the screen to produce corresponding target responses, first circuit means operatively connected to the first sensor means and responsive to the responses produced when the first sensor means on the tip portion is positioned adjacent selected ones of the parameter images on the screen for establishing simulated operating parameters, second circuit means operatively connected to the second sensor means and to the target responses produced when the second sensor means is positioned adjacent the target image appearing on the screen, said second circuit means producing responses when positioning the tip portion adjacent the target image during a simulated welding operation representative of arc length and tool orientation relative to target image.

17. An instrument for training, testing and/or evaluating persons who do welding comprising, a video monitor having a cathode ray tube with a screen portion, means for generating set up images on the monitor screen including images to represent selected parameters representative of parameters of an actual welding operation such as arc length and arc angular orientation and an image to represent a simulated joint to be welded with a target image movable therealong, a tool representative of an actual welding tool having a handle portion, and a tip portion, said tool to be held and the tip portion manipulated adjacent to the screen by a person to be trained, tested and/or evaluated, first and second sensor means on the tip portion of the tool sensitive to selected distinct images appearing on the screen, the first sensor means producing responses representative of arc length and arc orientation when the tool is held and the tip portion moved to a position adjacent the target image, the second sensor means producing responses representative of set up images appearing on the screen when positioned adjacent selected parameter images.

18. The instrument of claim 17 wherein selected ones of the responses produced are electromagnetic responses.

19. The instrument of claim 17 wherein selected ones of the responses produced are optical responses.

20. The instrument of claim 17 wherein the tool is representative of an arc welding tool.

21. The instrument of claim 17 wherein the tool is representative of a TIG welding gun.

22. The instrument of claim 17 wherein the tool is representative of a MIG welding gun.

23. The instrument of claim 17 wherein the tool is representative of a stick type welding gun having a retractable simulated welding rod electrode.

24. The instrument of claim 17 wherein the video monitor includes a microprocessor and associated circuit means under control thereof for generating the set up images.

25. The instrument of claim 17 wherein the video monitor includes means for producing images to represent a joint to be welded and a target located on the joint and movable therealong.

26. The instrument of claim 17 including means on the tool for reacting with images on the screen during a simulated welding operation including means to recognize and count operator errors caused by breaks in the welding arc and errors caused by angular orientations of the tool beyond a predetermined angular orientation.

27. The instrument of claim 26 including means to produce a record of the welding and angular orientation errors.

28. Means for generating electromagnetic responses comprising a device having a cathode ray tube including a tube envelope with a screen face, a coating of a material having electric conductive characteristics applied on the inner surface of the screen face of the tube, means connecting the coating to a source of voltage, and a probe device having a sensor element mounted thereon for movement to a position adjacent to the screen face whereby an electromagnetic response is generated by the interaction of the voltage of said coating on the screen face and the sensor element.

29. The means of claim 28 wherein the coating on the tube face is an aluminum phosphor coating.

30. The means of claim 28 wherein the response generated between the coating and the sensor element has characteristics representative of the distance between the sensor element and the coating.

31. The means of claim 28 wherein the response generated between the coating and the sensor element has characteristics representative of the orientation of the probe relative to the screen face.

32. The means of claim 28 wherein the probe includes circuit means connected to the sensor element including amplifier circuit means for amplifying the electromagnetic responses produced when the sensor element is moved adjacent to the screen face.

33. A device for simulating an arc welding operation comprising a video monitor including a cathode ray tube having means forming a tube anode on the inner surface thereof and having a screen on which images are generated including images for use in establishing operating parameters for a simulated welding operation and images including a simulated joint to be welded and an associated target image located adjacent to and movable along the simulated joint, a simulated welding tool having a handle portion and a tip portion with means thereon for positioning adjacent to the images on the screen, circuit means responsive to positioning of the tip portion adjacent selected images on the screen for establishing simulated operating parameters, and other circuit means responsive to positioning the tip portion adjacent the target image during a simulated welding operation to produce responses representative of arc length and tool orientation relative to target image, the position of the tip portion of the simulated tool relative to the tube anode producing electromagnetic response signals representative of the spacing between the tip portion and the target image and representative of the orientation of the tool relative to the target image.

34. An instrument for training, testing and/or evaluating persons who do welding comprising, a video monitor having a cathode ray tube with a screen portion, means for generating set up images on the monitor screen including images to represent selected parameters representative of parameters of an actual welding operation, a tool representative of an actual welding tool having a handle portion, and a tip portion, said tool to be held and manipulated by a person to be trained, tested and/or evaluated, means on the tip portion of the tool sensitive to selected images appearing on the screen for producing responses representative of arc length and orientation when the tool is held and the tip portion moved to a position adjacent selected ones of the images, the cathode ray tube including a closed tube with a front wall having a layer of material including a conductive material formed on the inner surface thereof to form a tube anode.

* * * * *

UNITED STATES PATENT AND TRADEMARK OFFICE
CERTIFICATE OF CORRECTION

PATENT NO. : 4,931,018

DATED : June 5, 1990

INVENTOR(S) : Donald J. Herbst et al

It is certified that error appears in the above-identified patent and that said Letters Patent is hereby corrected as shown below:

Column 5, line 55, "mean" should be --means--.

Column 10, line 4, "bas" should be --base--.

Signed and Sealed this

Fourteenth Day of May, 1991

*Attest:*

HARRY F. MANBECK, JR.

*Attesting Officer*     *Commissioner of Patents and Trademarks*